Figure 2:
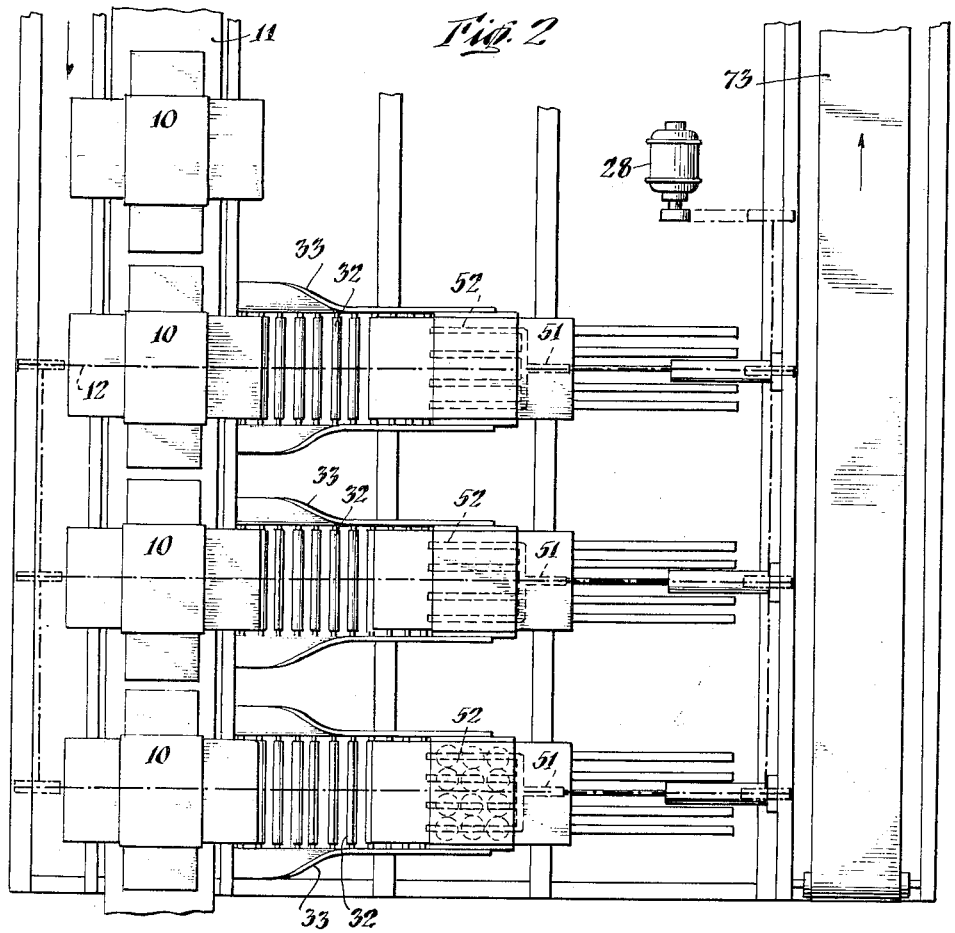

Sept. 20, 1955  C. M. JONES ET AL  2,718,319
AUTOMATIC CARTON EMPTIER

Filed March 26, 1954  5 Sheets-Sheet 1

INVENTORS
Clarence M. Jones
Thomas M. Ross
BY
Raymond W. Barclay
ATTORNEY

Sept. 20, 1955     C. M. JONES ET AL     2,718,319
AUTOMATIC CARTON EMPTIER
Filed March 26, 1954     5 Sheets-Sheet 2

INVENTORS
Clarence M. Jones
BY Thomas M. Ross
Raymond W. Barclay
ATTORNEY

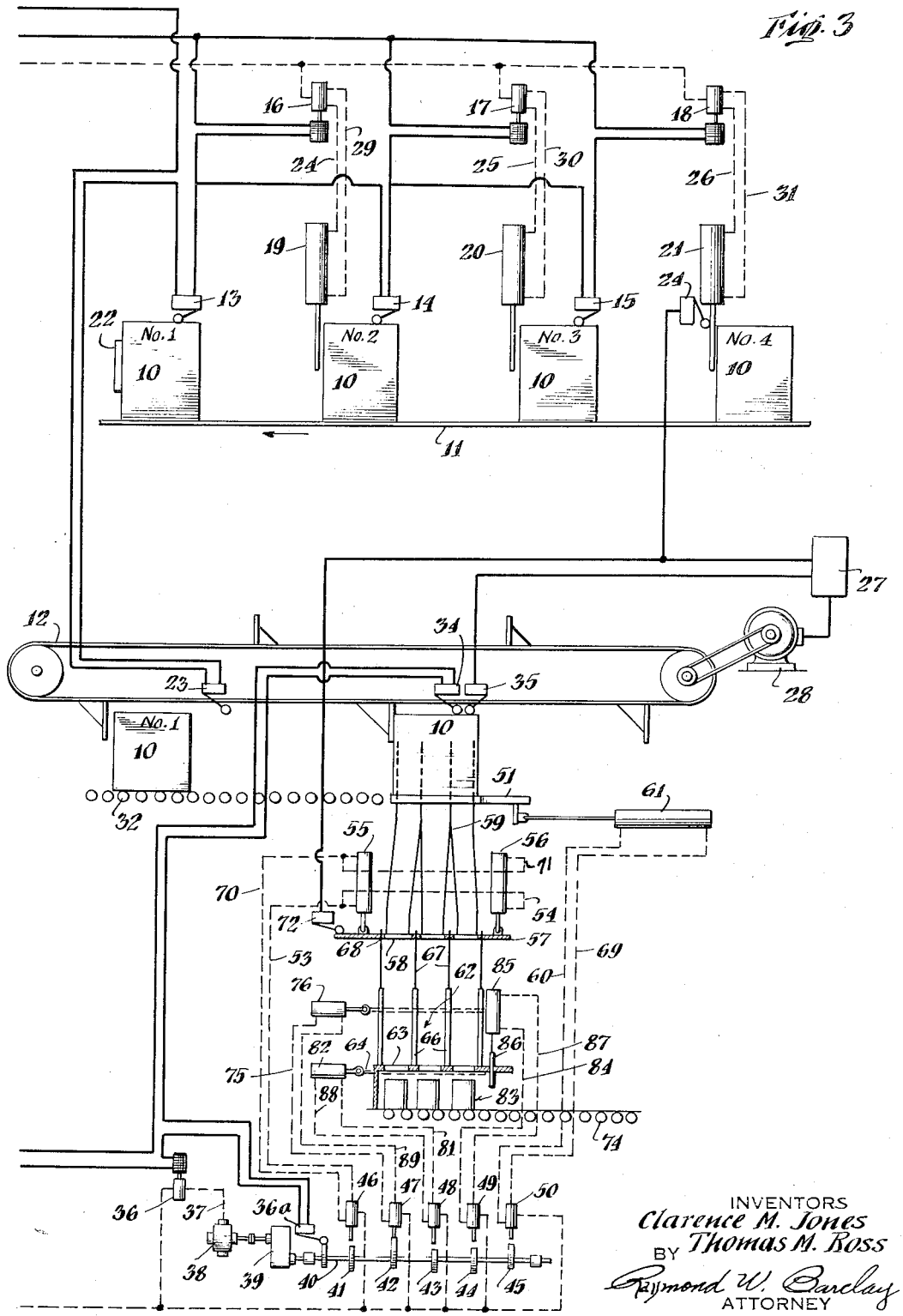

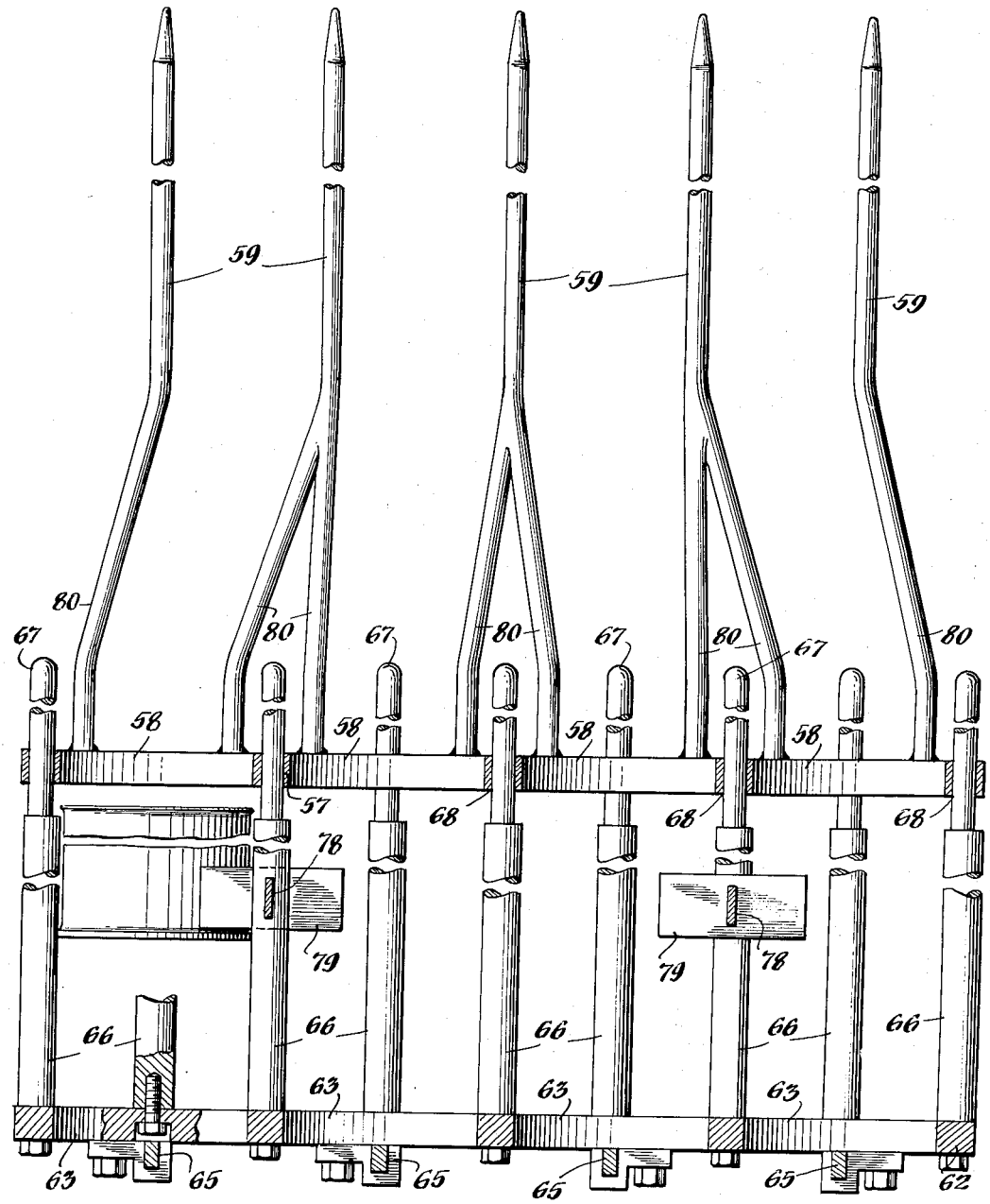

Sept. 20, 1955 — C. M. JONES ET AL — 2,718,319
AUTOMATIC CARTON EMPTIER
Filed March 26, 1954 — 5 Sheets-Sheet 5

INVENTORS
Clarence M. Jones
BY Thomas M. Ross
Raymond W. Barclay
ATTORNEY

United States Patent Office 2,718,319
Patented Sept. 20, 1955

2,718,319

AUTOMATIC CARTON EMPTIER

Clarence M. Jones and Thomas M. Ross, Beaumont, N. J., assignors to Socony Mobil Oil Company, Inc., a corporation of New York Application March 26, 1954, Serial No. 418,923

4 Claims. (Cl. 214—301)

This invention relates to an apparatus for removing containers from shipping cartons and more particularly is directed to a machine for automatically emptying cartons of containers which are packed therein in the form of two or more superimposed layers. The invention is in the form of an assembly of mechanisms which receives the containers packed in cartons as aforesaid and removes the containers from the cartons for filling, labeling, or other treatment thereof.

Automatic emptying machines for removing cans and other containers packed in a single layer in boxes, cartons, etc., are commercially available. Machines for unpacking cartons wherein the containers are present in two or more layers, however, have not received commercial adoption despite the fact that several such devices have been proposed. It has remained the general practice to manually unpack containers from cartons in which the containers are present in the form of superimposed layers. It is accordingly the principal object of the present invention to provide a commercially feasible apparatus for automatically emptying cartons containing two or more layers of containers.

The apparatus illustrated herein shows emptying of ordinary cardboard cartons containing 24 cylindrical tin cans packed in the form of two layers of 12 cans each. It will be apparent, however, that the invention is applicable to the emptying of packages other than cardboard cartons and to the unpacking of individual containers other than tin cans. Likewise, the principles of the present invention may be employed in emptying cartons containing three, four, or more layers of containers.

In general, the apparatus of the present invention comprises the combination of means for transporting the opened cartons in inverted position, means for automatically stopping said conveyor and positioning the cartons thereon individually at an unloading station, a release gate immediately underlying the unloading station, a plurality of vertically movable guide fingers, a container receiver, means for elevating the guide fingers through the release gate into the carton and between the containers, means for opening the release gate allowing the containers to fall between the guide fingers and into the container receiver, means for rigidly holding the top layer of containers in the container receiver, means for releasing the lower layer of containers from the container receiver while the top layer of containers is retained therein, an outlet conveyor for receiving and transporting the lower layer of containers from the container receiver, means for thereafter releasing the top layer of containers to the bottom of the container receiver and means for releasing the top layer of containers from the container receiver to the outlet conveyor.

Figure 7:
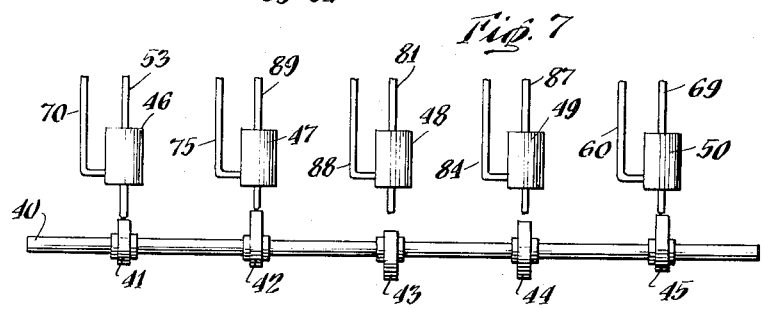
Figure 6:
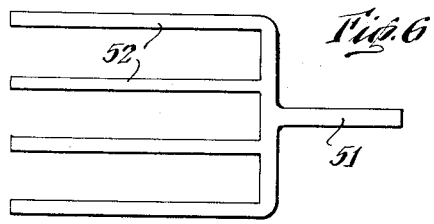
Figure 5:
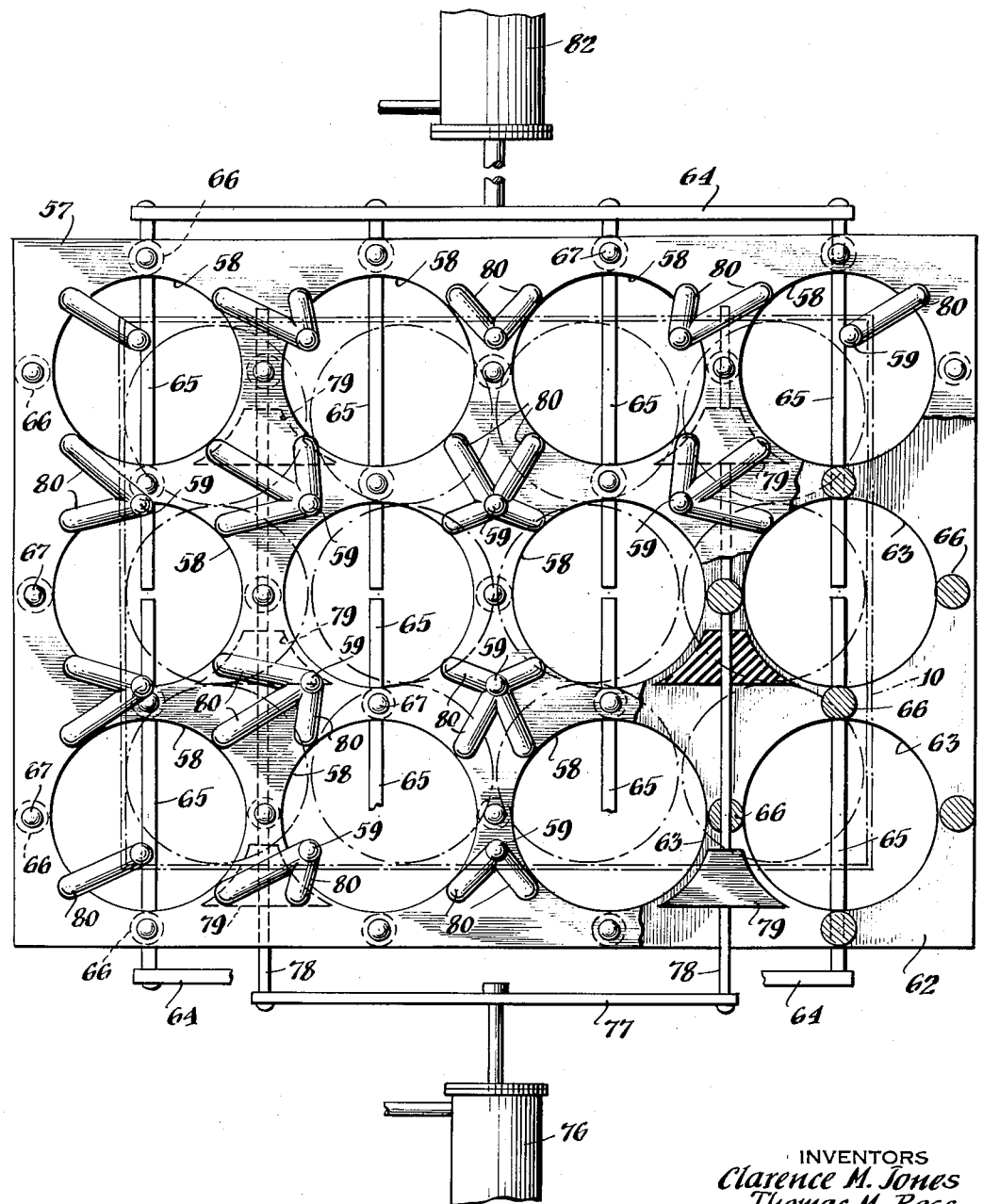

The invention may be further understood from a consideration of the drawings in which a preferred but non-limiting embodiment of the apparatus is shown. Referring more particularly to the drawing:

Figure 1 is an elevational view of the machine.
Figure 2 is a plan view of the machine.
Figure 3 is a control diagram of the machine.
Figure 4 is a detailed elevational view of means for holding the top layer of containers.
Figure 5 is a plan view of the holding means shown in Figure 4.
Figure 6 is a detailed view of the release gate.
Figure 7 is a detailed view of the program cam shaft.

As illustrated in Figures 1–3, the cartons 10, full of containers, enter the machine on inlet conveyor 11 in an inverted position with their flaps opened. As the cartons arrive on conveyor 11, they are positioned automatically under carton chain conveyor 12. Positioning is accomplished by limit switches 13, 14, and 15, solenoid air valves 16, 17, and 18 and air cylinder operated stops 19, 20, and 21. More particularly, as shown in Figure 3, carton No. 1 proceeds on conveyor 11 until it contacts stop 22, tripping limit switch 13 which is connected through starter switch 23 to a source of electric current. Switch 13, in turn, actuates air valve 16, permitting air to pass therethrough and into the upper portion of air cylinder operated stop 19 through conduit 24, forcing the stop thereof downward so that carton No. 2, upon coming into contact with such stop, is unable to proceed further. Switch 13 also conditions limit switch 14. Carton No. 2, passing under switch 14, trips the same, which serves to actuate air valve 17, permitting air to pass therethrough into conduit 25 and then into the upper portion of air cylinder operated stop 20, forcing the stop thereof downward so that carton No. 3, upon coming into contact with such stop, is unable to proceed further. Switch 14 also conditions limit switch 15. Carton No. 3, upon contacting switch 15, trips the same, which opens air valve 18, allowing air to flow into conduit 26 leading to the upper portion of air cylinder operated stop 21, forcing the stop thereof downward so that carton No. 4, upon coming into contact with such stop, is unable to proceed further. The stop 21, upon descending, trips limit switch 24, which is connected to motor starter 27 and motor 28. Motor 28, upon being started, places carton chain conveyor 12 in motion. As the cartons are transported by conveyor 12 and leave inlet conveyor 11, they trip switch 23, resetting the positioning stops by actuating switch 13 which in turn actuates switch 14 and also air valve 16, allowing air to pass through conduit 29 into the lower portion of air cylinder operated stop 19, which forces the stop thereof to retract into the cylinder. Switch 14, in turn, actuates switch 15 and also air valve 17, permitting air to pass into the lower portion of air cylinder operated stop 20 through conduit 30, which forces the stop to recede into the cylinder. Likewise, switch 15 actuates air valve 18, permitting air to pass through conduit 31 into the lower portion of air cylinder operated stop 21, forcing the stop thereof to retract into the cylinder. The resetting of the positioning stops allows three more cartons to move into position as indicated hereinabove.

As the carton is conveyed by the chain conveyor 12 along rollers 32 and between guide walls 33, limit switches 34 and 35 are respectively tripped just before and as the carton arrives at the carton unloading station. Limit switch 35 is connected through motor starter 27 to motor 28 and serves to stop motor 28, which in turn stops carton chain conveyor 12. Limit switch 34 actuates a 10-second delay solenoid air valve 36 connected to a source of electric current, which allows a stream of air to flow through conduit 37 to air motor 38, starting the same, which serves, through reduction gear 39, to turn cam shaft 40 through one revolution, which carries the carton unloader through one unloading cycle. Connected in series with solenoid air valve 36 is micro switch 36a, which serves to hold the circuit open until one revolution of the program cams is complete, thereby preventing a short cycle in the event a carton is inadvertently moved

We claim:

1. An apparatus for unpacking containers from cartons in which the containers are arranged in superimposed layers comprising conveyor means for transporting the opened cartons in inverted position, means for automatically stopping and positioning the cartons thereon individually at an unloading station, a release gate immediately underlying said unloading station, a plurality of vertically movable guide fingers, a container receiver, means for elevating said guide fingers through said release gate into the carton and between said containers, means for opening said release gate whereby the containers fall between said guide fingers into said container receiver, means for holding the top layer of containers in said container receiver, means for releasing the lower layer of containers from said container receiver while the top layer of containers is retained therein, an outlet conveyor for receiving and transporting said lower layer of containers from said container receiver, means for thereafter releasing the top layer of containers to the bottom of said container receiver and means for releasing said top layer of containers from said container receiver to said outlet conveyor.

2. An apparatus for unpacking containers from cartons in which the containers are arranged in superimposed layers comprising conveyor means for transporting the opened cartons in inverted position, means for automatically stopping and positioning the cartons thereon individually at an unloading station, a release gate immediately underlying said unloading station, a plurality of vertically movable guide fingers, a program cam shaft, a plurality of air actuated cylinders responsive to revolution of said cam shaft, a container receiver, means responsive to actuation of an air cylinder for elevating said guide fingers through said release gate into the carton and between said containers, means responsive to actuation of one of the aforesaid air cylinders for opening said release gate whereby the containers fall between said guide fingers into said container receiver, means responsive to actuation of an air cylinder for holding the top layer of containers in said container receiver while the lower layer of containers is free for discharge therefrom, means responsive to actuation of an air cylinder for releasing the lower layer of containers from said container receiver while the top layer of containers is retained therein, an outlet conveyor for receiving and transporting said lower layer of containers from said container receiver, means responsive to actuation of one of said air cylinders for releasing the top layer of containers to the bottom of said container receiver and means responsive to one of the aforesaid air cylinders for releasing said top layer of containers from said container receiver to said outlet conveyor.

3. An apparatus for unpacking containers from a carton in which the containers are arranged in superimposed layers comprising a release gate for retaining the containers in said carton when the latter is in inverted position, a plurality of guide fingers, the space between adjacent members of which is slightly greater than the diameter of said containers, a container receiver, means for elevating said guide fingers into said inverted carton and between the containers therein, means for opening said release gate whereby the containers fall between said guide fingers into said container receiver, means for discharging the lower layer of containers from said container receiver while retaining the upper layer of containers therein, an outlet conveyor for receiving and transporting said lower layer of containers from said container receiver, and means for thereafter discharging the upper layer of containers from said container receiver to said outlet conveyor.

4. An apparatus for unpacking containers from a carton in which the containers are arranged in superimposed layers comprising means for discharging all of said containers in the form of inverted layers from said carton while the latter is maintained in an upside-down position, a container receiver adapted to receive and retain said containers, conveying means for transporting said containers from said container receiver, means for firmly holding the top layer of containers in said container receiver while the lower layer of containers therein is free for discharge from said container receiver, means for discharging said lower layer of containers from said container receiver to said conveying means and means for subsequently releasing the top layer of said containers from said container receiver to said conveying means.

No references cited.